US005354589A

United States Patent [19]

Wass

[11] Patent Number: 5,354,589

[45] Date of Patent: Oct. 11, 1994

[54] HINGED STRUCTURES

[75] Inventor: Geoffrey L. Wass, London, United Kingdom

[73] Assignee: Kidabra Limited, London, United Kingdom

[21] Appl. No.: 946,767

[22] Filed: Sep. 17, 1992

[51] Int. Cl.[5] ........................ E04B 1/38; A63H 33/10; F16B 1/00

[52] U.S. Cl. ...................................... 428/61; 428/120; 428/131; 428/192; 52/91.1; 52/285.1; 52/582.1; 160/231.1

[58] Field of Search .................... 428/58, 61, 131, 192, 428/120; 52/582, 285, 90, 91.1, 285.1; 446/111, 112, 113, 119; 16/227; 160/231.1; 403/291, 408.1

[56] References Cited

U.S. PATENT DOCUMENTS 720,646 9/1901 Westfahl .......................... 160/231.1
970,861 9/1910 Veach ............................. 160/231.1

*Primary Examiner*—Alexander S. Thomas
*Attorney, Agent, or Firm*—Richard H. Kosakowski

[57] ABSTRACT

A hinge comprises two struts around which pass the two loops of a figure-of-eight of webbing material, the ends of the webbing material being secured to each other and/or to a strut by fixing means. A number of panels are secured together by such hinges to form a large structure such as a children's playhouse which can be folded when not in use. A separate roof also comprising similarly-hinged panels may be provided.

3 Claims, 5 Drawing Sheets

HINGED STRUCTURES

BACKGROUND OF THE INVENTION

1. Field of the Invention

The present invention relates to hinged structures and more particularly to structures which are collapsible.

Related Art

Existing structures such as children's playhouses are substantially permanent, that is once erected they remain occupying a relatively large amount of space even though they are actually used for only short periods.

The present invention seeks to provide a structure which can be quickly erected, is secure when in use, but can be quickly folded away after use.

SUMMARY OF THE INVENTION

According to the present invention, there is provided a structure comprising a plurality of wall or panel members with through holes adjacent edge portions thereof, at least two of said members being secured together by one or more hinges, each hinge comprising a length of webbing material in figure-of-8 configuration with two loops, each loop being wrapped around an edge portion and through one of said holes of a respective one of the wall or panel members.

After applying the hinges to the structure, the webbing material may be secured by means of sewing, nailing, screwing or rivetting.

Each pair of wall or panel members is preferably secured by at least two spaced hinges for reasons of stability.

Preferred embodiments of the present invention will now be described, by way of example only with reference to the accompanying drawings, of which:

DESCRIPTION OF THE PREFERRED EMBODIMENT

Figure 1:
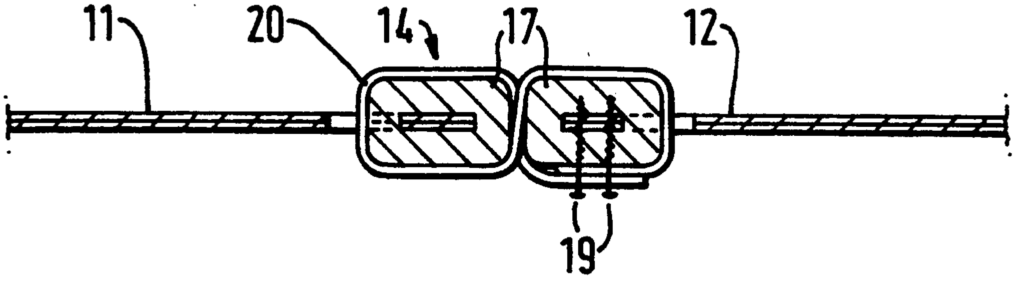
FIG. 1 is a cross-sectional view of a hinge in accordance with the present invention.
Figure 2:
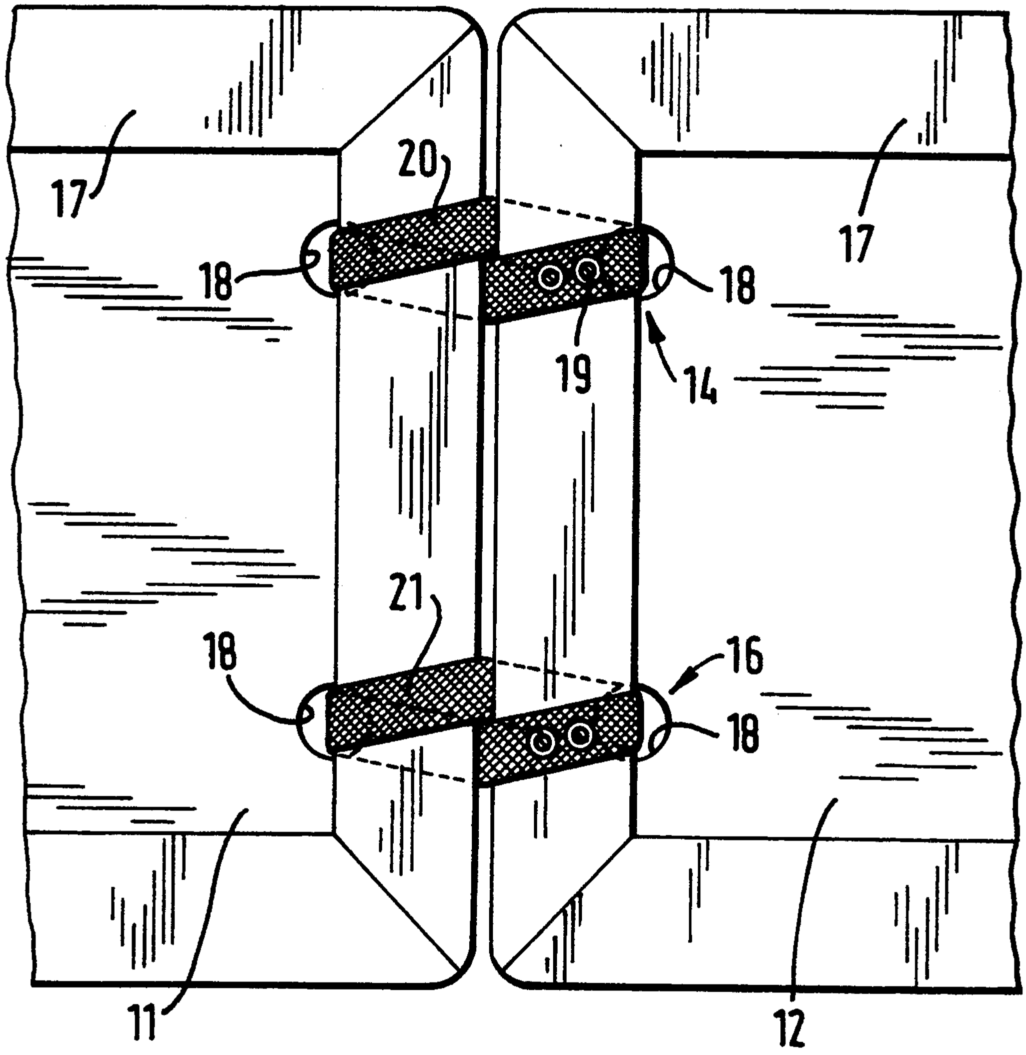
FIG. 2 is a side view of the hinge of FIG. 1.

Referring to the drawings, FIGS. 1 and 2 show two panels 11,12 connected together by means of two hinges 14,16 in accordance with the present invention. The panels are of 3 mm. plywood and have a spruce trim 17, adjacent which are provided through holes 18. The hinges comprise polyester webbing strips 20,21 which are passed through the holes 18 in figure-of-8 fashion and are then secured by screws 19 entering the trim 17.

The torque exerted by the webbing on the screws is relatively low, so that a large fastening is not necessary.

Figure 3A:
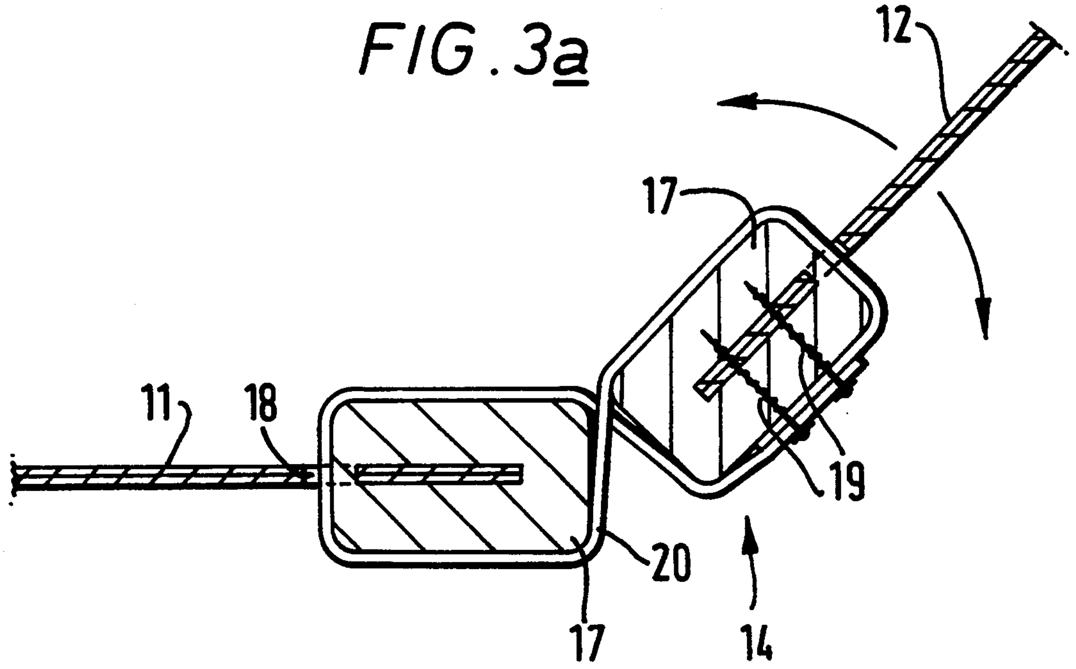
FIGS. 3*a* and 3*b* are enlarged cross-sectional views illustrating the rotational range of the hinge.
Figure 3B:
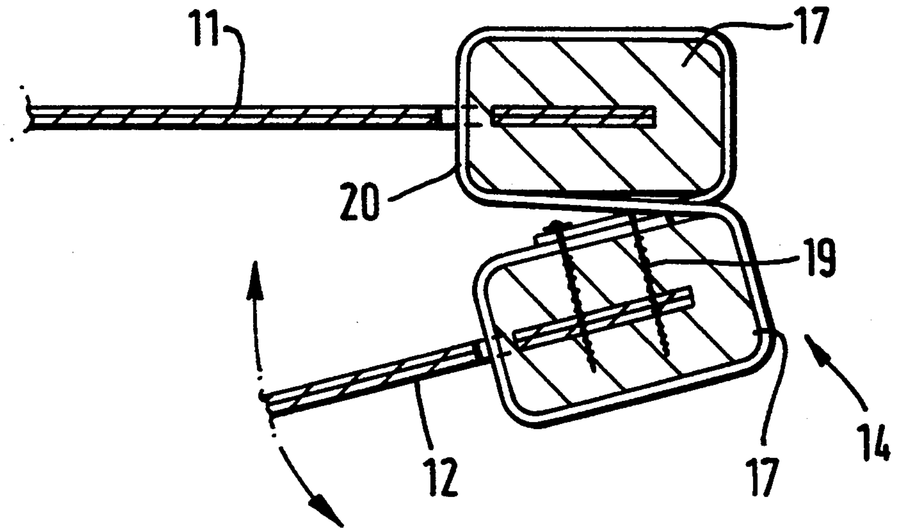
Figure 4:
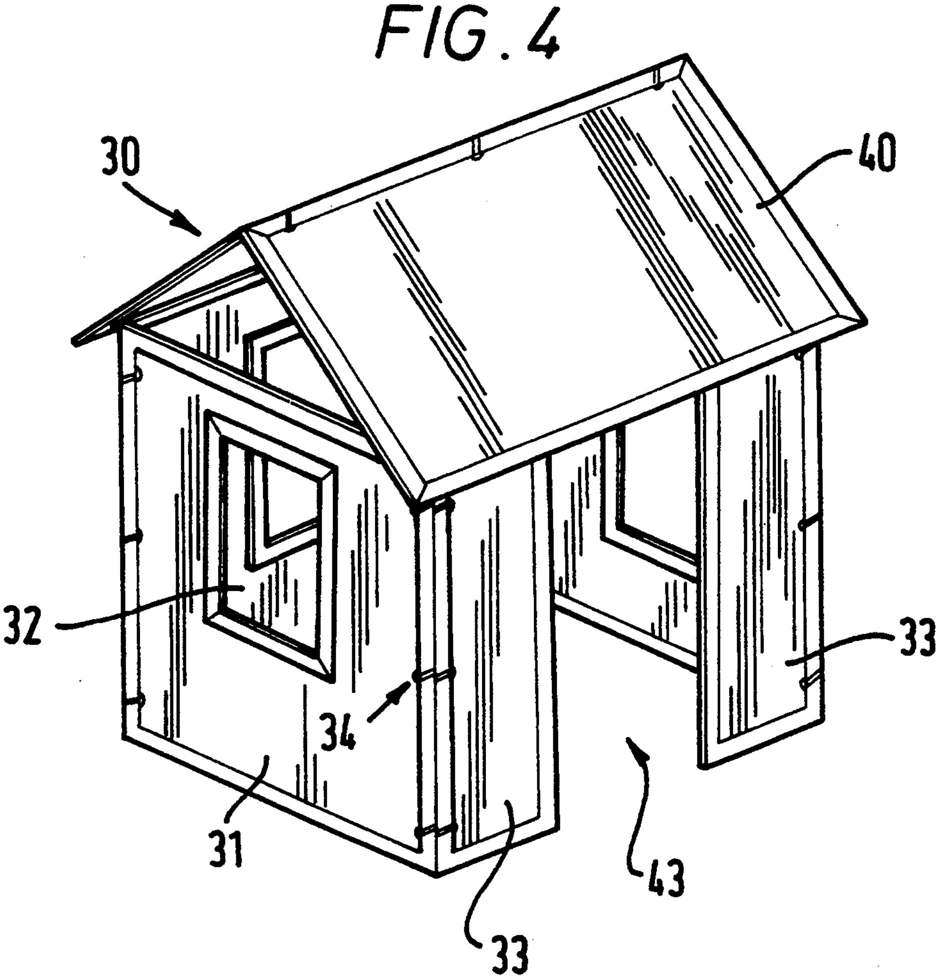
FIG. 4 is a perspective view of a structure constructed in accordance with the present invention.
Figure 5:
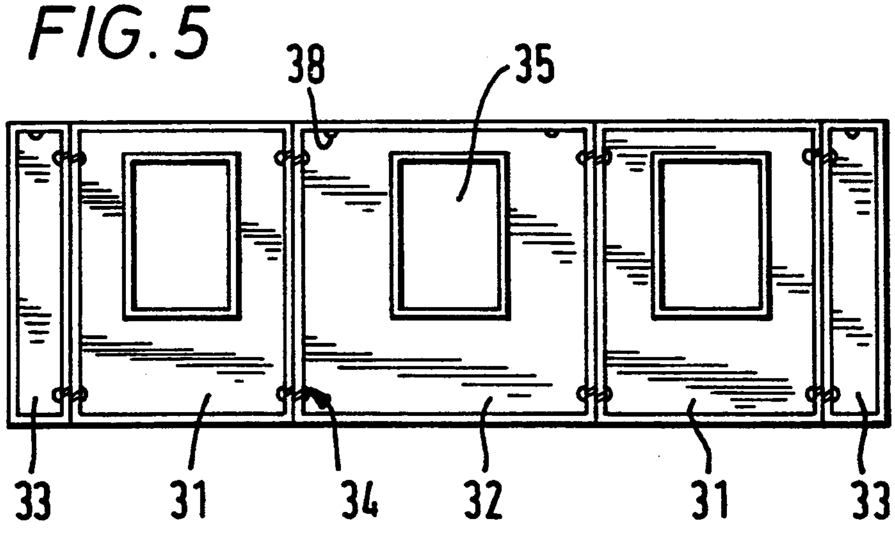
FIG. 5 is a view of the walls of the structure of FIG. 4 in an unfolded flat configuration.
Figure 6:
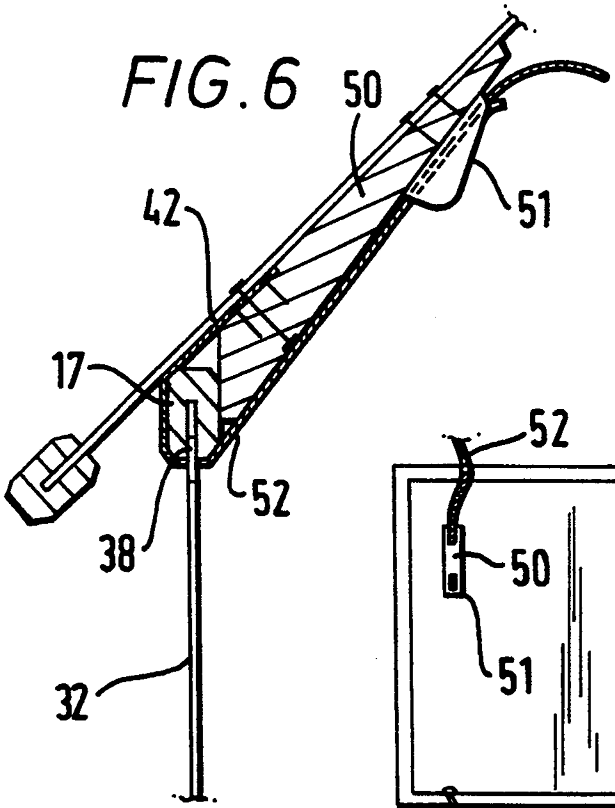
FIG. 6 shows the engagement of the roof and a wall of the structure of FIG. 4.

As shown in FIGS. 3*a* and 3*b* the hinges 14,16 permit a 360° range of relative rotation between the two panels. This means that panel 12 can be folded up against panel 11 in either the clockwise or anti-clockwise direction, enabling any constructed shape to be folded flat. The hinges are strong since an increased load on it acts to tension the webbing and to hold the trims 17 together in contrast to conventional hinges which tend to be forced apart under load. The polyester material is resistant to wear and tear, to shocks and to the weather.

Referring now to FIGS. 4 to 7, there is shown a children's playhouse 30 constructed in accordance with the present invention. The walls of the house comprise five panels, viz. a back panel 32, two side panels 31, and two front panels 33 arranged to define an entrance 43, all the panels being connected by means of hinges 34 as shown in FIGS. 1 to 3. The panels have openings defining windows 35. At the top of the back and front panels there are provided through holes 38 to permit the attachment of a roof 40 after erection of the panels.

Figure 7:
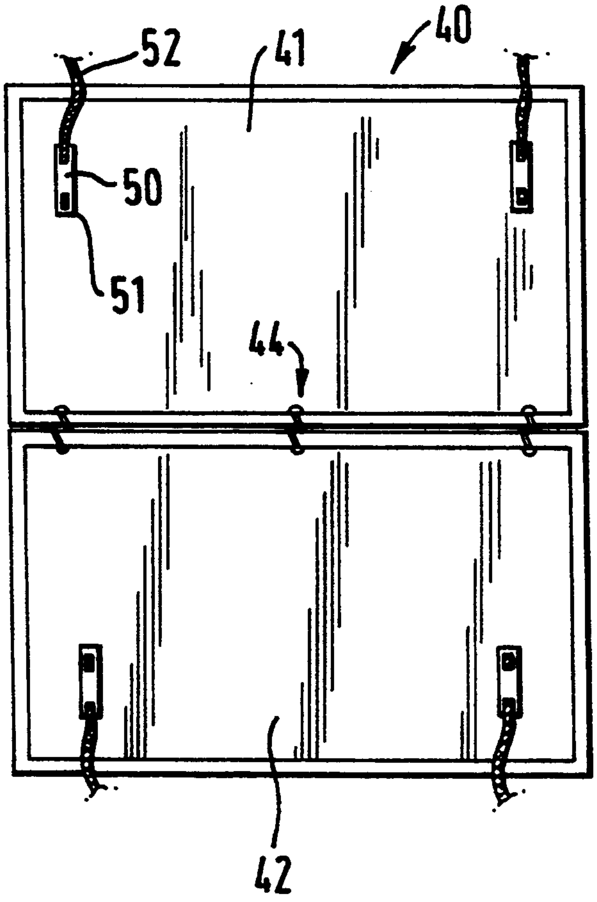
FIG. 7 shows the roof of the structure of FIG. 4 in an unfolded flat configuration.

As shown in FIG. 7, roof 40 comprises two panels 41,42 connected together by means of hinges 44 as shown in FIGS. 1 to 3. Adjacent the corners of the roof on its underside there are provided cleats 50, see FIG. 6. Each cleat comprises a lever locking device 51 for a strap 52 of polyester webbing material. One end of a strap 52 is first tacked into a rebate in the cleat, which is then glued and/or rivetted to the respective roof panel. At the same time, the respective locking device 51 is rivetted into place. In use, cleats 50 engage the top trim 17 and the free end of each strap 52 is passed through a respective hole 38 at the top of a wall panel and then underneath the lever of device 51 which then locks it. This gives the house structural rigidity.

The cleats 50 on panel 41 are slightly offset from those on panel 42 to allow the roof 40 to be folded flat when not in use.

An advantage of the playhouse is that it is quickly and easily erected or collapsed, but is stable and safe in use. In addition, it is light and easy to transport. Because the panels may be folded either way, a single house may have two completely different appearances painted on it, e.g. bricks on one side and planks on the other. Alternatively a town house may be painted on one side and a country cottage on the other side.

Numerous modifications can be made to the above-described structure. For example, one edge of one of the roof panels may be permanently attached to an edge of one of the wall panels. Because of the flexible nature of the hinges, the entire arrangement can still fold flat; however, it is desirable to provide some means for bracing the structure when erected.

Panels 33 may be replaced by a single panel extending across the entire front of the house 30 and having an opening therein defining entrance 43. In this case, the extended front panel is connected to one of the side panels 31 by means of hinges 34 and to the other side panel by releasable locking means.

Figure 8:
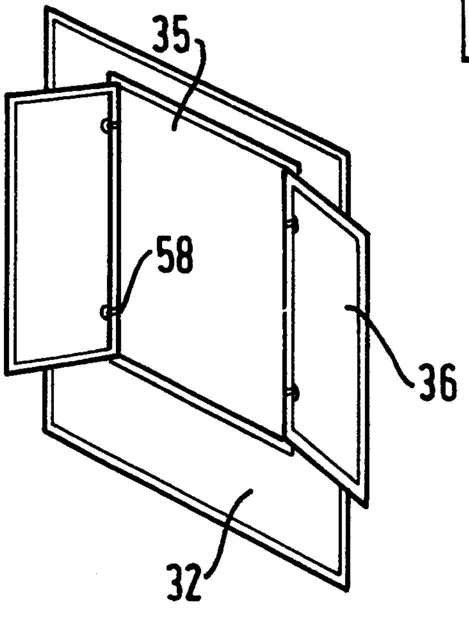
FIG. 8 shows a shuttered window in accordance with the present invention.

One or more of the windows 35 may have shutters 36, FIG. 8, and these are also preferably attached to the wall panel 32 by means of hinges 58 as shown in FIGS. 1 to 3. Entrance 43 may be provided with a door connected to one of the panels 33 by means of similar hinges.

Numerous other structures may be constructed with panels connected together with hinges according to the present invention, in particular the following items intended to be accessories for the playhouse: door, cooker unit, sink unit, bed, black board, book-case, bench, chimney/fireplace, table, dolls pram, dolls crib, ironing board, telephone, working sink tap (gravity fed), child-safe lights and clock.

Figure 9A:
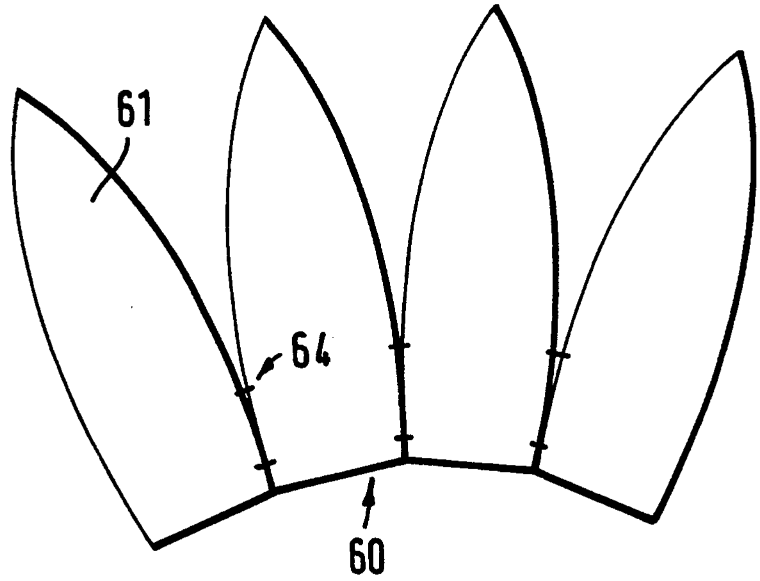
FIGS. 9*a* and 9*b* show a toy rocket ship in accordance with the invention in an unfolded flat configuration and an assembled configuration respectively.
Figure 9B:
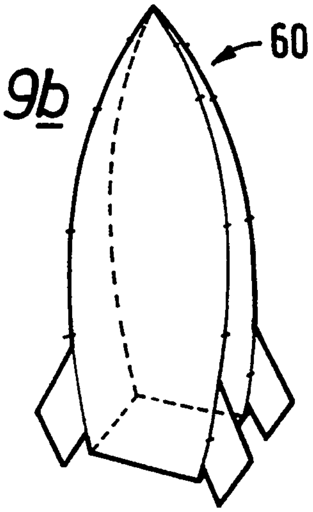

Other toys may also be constructed according to the invention, in particular a castle, a Noah's ark, a river boat, a caravan, a train, a lorry, a tugboat, a go-kart, a puppet theatre, a store, a windmill, a bridge, a toy box, a climbing frame or a tractor-type vehicle e.g. with winches, pulleys, cranes, wheels and/or gears. FIGS. 9*a* and *b* show a toy rocket 60 comprising four panels 61 connected by means of hinges 64 in accordance with FIGS. 1 to 3. An advantage of the use of these hinges is that the edges of the panels 61 can be curved and yet can still fold flat when not in use. When the rocket is erected, the tops of the panel can be pulled together by means of webbing material; this would not be possible with conventional hinges instead of hinges 64.

Further articles may incorporate hinges in accordance with the invention, in particular easels for art classes, display stands, street traders' stands, collapsible tables, interconnections for floating piers or pontoons, safety hinges for rudders on boats, attachments for aerodynamic or hydrodynamic controls such as rudders, ailerons and connecting linkages for ultralight aircraft, gliders or small open submersibles, wheelbarrows, gardens snow-protectors, garden sheds, stage props, boxes, kennels or other pet hutches, saunas, cat litter box covers, windbreaks or store fitting rooms. No matter how many panels there are, and how complicated the erected structure, it may be folded flat for storage and transportation.

Figure 10A:
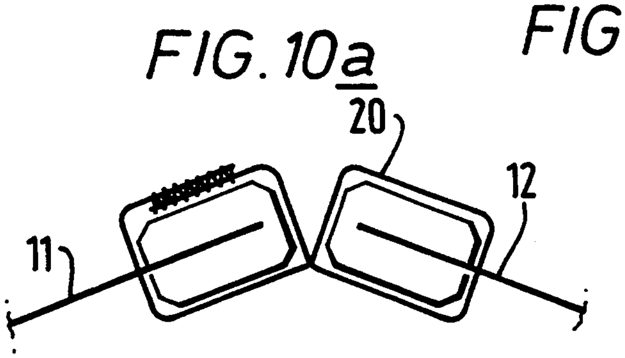
FIGS. 10*a, b* and *c* show a modified hinge in accordance with the present invention.

FIGS. 10*a*, *b* and *c* show alternative ways in which the polyester strips 20 can be attached to the edges of the panels 11,12.

Figure 10B:
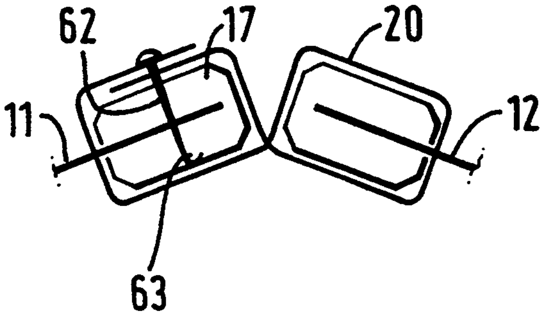
Figure 10C:
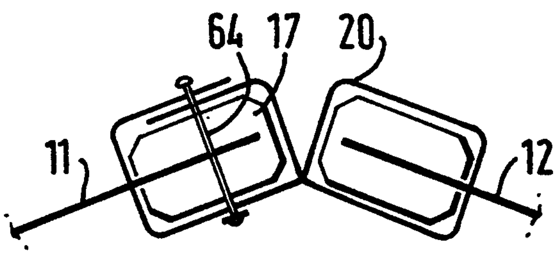

In FIG. 10*a*, after looping the strip 20 through the holes 18, the ends of the strip are sewn together; no further fastening is necessary and there is no weak point in the webbing. In FIG. 10*b* a copper clinch nail 62 is hammered into the trim 17 against an anvil (not shown) so that the end 63 of the nail turns back on itself to give a firm grip. In FIG. 10*c* a rivet 64 penetrates the entire trim 17; the rivet holds the strip as effectively as a bolt, but lies flush with the webbing and cannot come unscrewed.

Any suitable plastics or other material may be used for the webbing material 20 and, if desired, materials other than wood can be used for the panels 11,12.

Instead of a single hole 18 in each panel, the hinge may comprise a plurality of holes in each panel, with webbing material 20 being laced therethrough, with the loops still maintaining the figure-of-8 configuration. Such an arrangement gives greater strength and stability.

Having thus described the invention, what is claimed is:

1. A playhouse comprising a wall structure having a top edge and a roof structure, said roof structure being supported by at least part of said top edge, both said roof structure and said wall structure comprising a plurality of panel members, each panel member being connected to an adjacent plate member by hinge means, and each of said panel members having a plurality of edge portions; wherein each panel has one or more apertures through an edge portion thereof, said edge portion being adjacent an edge portion of said adjacent panel member, said edge portion of said adjacent panel having a further aperture therethrough, and said hinge means comprises a length of webbing material configured in a figure-of-eight, said length of material comprising first and second loops, said first loop passing around said edge portion and through said aperture of said panel member, and said second loop passing around said edge portion and through said aperture of said adjacent panel member.

2. A playhouse according to claim 1, wherein said panel members of said roof structure have upper faces and lower faces, said lower faces being supported by at least part of said top edge, said lower faces incorporating cleat members, said cleat members engaging said top edge of said wall structure.

3. A playhouse according to claim 1, further comprising a plurality of securing straps, wherein said edge portion of said wall structure adjacent said top edge of said wall structure and said edge portion of said roof structure adjacent said top edge have a plurality of holes through them, and in use said securing straps pass through the holes.

* * * * *